US011003579B2

(12) United States Patent
Cui et al.

(10) Patent No.: US 11,003,579 B2
(45) Date of Patent: May 11, 2021

(54) METHOD, DEVICE AND COMPUTER PROGRAM PRODUCT FOR MANAGING DISTRIBUTED SYSTEM

(71) Applicant: EMC IP Holding Company LLC, Hopkinton, MA (US)

(72) Inventors: Wei Cui, Beijing (CN); Kun Wang, Beijing (CN); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/381,849

(22) Filed: Apr. 11, 2019

(65) Prior Publication Data

US 2019/0324901 A1 Oct. 24, 2019

(30) Foreign Application Priority Data

Apr. 20, 2018 (CN) .......................... 201810360134.2

(51) Int. Cl.
*G06F 12/06* (2006.01)

(52) U.S. Cl.
CPC .. *G06F 12/0646* (2013.01); *G06F 2212/1008* (2013.01); *G06F 2212/154* (2013.01)

(58) Field of Classification Search
None
See application file for complete search history.

(56) References Cited

U.S. PATENT DOCUMENTS

| 6,693,635 B1* | 2/2004 | Yokomizo | G06T 11/60 345/161 |
| 9,448,901 B1* | 9/2016 | Aslam | G06F 11/2097 |
| 2007/0008328 A1* | 1/2007 | MacWilliams | G06F 12/0646 345/530 |
| 2011/0271059 A1* | 11/2011 | Aho | G06F 9/3881 711/147 |
| 2015/0039834 A1* | 2/2015 | Cudak | G06F 11/2025 711/130 |
| 2018/0276030 A1* | 9/2018 | Krauss | G06F 9/547 |
| 2018/0285568 A1* | 10/2018 | Finger | G06F 21/575 |
| 2020/0334150 A1* | 10/2020 | Lee | H04L 29/08 |

* cited by examiner

*Primary Examiner* — Edward J Dudek, Jr.
*Assistant Examiner* — Ralph A Verderamo, III
(74) *Attorney, Agent, or Firm* — Ryan, Mason & Lewis, LLP

(57) ABSTRACT

A method of managing a distributed system comprises: in response to receiving data that changes in a first memory region of a client, updating data in a second memory region with the received data based on a mapping between the first memory region and the second memory region; in response to receiving a calling request for a computing node in a server from the client, causing the computing node to perform a processing step based on the updated data in the second memory region; determining data that changes after the processing step in the second memory region; and transmitting, to the client, the data that changes after the processing step, such that the client updates the data in the first memory region based on the mapping.

20 Claims, 10 Drawing Sheets

METHOD, DEVICE AND COMPUTER PROGRAM PRODUCT FOR MANAGING DISTRIBUTED SYSTEM

RELATED APPLICATION(S)

The present application claims priority to Chinese Patent Application No. 201810360134.2, filed Apr. 20, 2018, and entitled "Method, Device and Computer Program Product for Managing Distributed System," which is incorporated by reference herein in its entirety.

FIELD

Embodiments of the present disclosure generally relate to the field of distributed systems, and more specifically, to a method, a device and a computer program product for managing a distributed system.

BACKGROUND

Applications on a client device may be designed for utilizing computing resources such as processing and storage resources for accomplishing processing or analysis tasks of various types. With the increase of demand and complexity of computing tasks such as deep learning, high performance computing, machine learning, data mining and so on, a large amount of and/or variable computing nodes are needed to satisfy operations of corresponding applications, which may be realized by a machine or a system having a plurality of computing nodes. For example, a cloud-based distributed system has been developed, which includes a host having one or more computing nodes. Different clients may rent the computing nodes of the system as needed so as to run their respective applications.

In addition, with the development of computer technologies, the type of computing nodes becomes richer and richer and is no longer limited to traditional computing nodes, such as computing nodes with a central processing unit. For instance, in recent years, the computing capability of a graphic processing unit (GPU) has become more and more powerful. Based on its specific attributes, the GPU is particularly well-suited for performing large-scale data computation in aspects such as deep learning, machine learning and the like. However, for most client devices, performances of their GPUs are generally rather limited and these devices do not have a processing capability with high performance. Meanwhile, a GPU with high performance is usually very expensive. Therefore, studies are more and more focused on how to more effectively utilize the computing capability of the high-performance GPU used by remote devices to process local computing tasks.

SUMMARY

Embodiments of the present disclosure provide a method, a device and a computer program product used in a distributed system for managing the distributed system.

According to a first aspect of the present disclosure, there is provided a method of managing a distributed system. The method comprises: in response to receiving data that changes in a first memory region of a client in the distributed system, updating data in a second memory region of a server in the distributed system using the received data, based on a mapping between the first memory region and the second memory region; in response to receiving a calling request for a computing node in the server from the client, causing the computing node to perform a processing based on the updated data in the second memory region; determining data that changes after the processing in the second memory region; and transmitting, to the client, the data that changes after the processing, such that the client updates the data in the first memory region based on the mapping.

According to a second aspect of the present disclosure, there is provided a method of managing a distributed system. The method comprises: in response to determining that data in a first memory region of a client in the distributed system changes, transmitting the data that changes to a server in the distributed system, such that the server updates data in the second memory region using the data that changes based on a mapping between the first memory region and the second memory region of the server; transmitting, to the server, a calling request for a computing node in the server, so that the computing node performs a processing based on the data that changes in the second memory region; and in response to receiving, from the server, the data that changes in the second memory region after the processing, updating the data in the first memory region based on the mapping.

According to a third aspect of the present disclosure, there is provided a device for managing a distributed system. The device comprises: one or more processors; a memory coupled to at least one of the one or more processors; computer program instructions stored in the memory which, when executed by the at least one processor, cause the device to perform the following acts, comprising: in response to receiving data that changes in a first memory region of a client in the distributed system, updating data in the second memory region of a server in the distributed system with the received data based on a mapping between the first memory region and the second memory region; in response to receiving a calling request for a computing node in the server from the client, causing the computing node to perform a processing based on the updated data in the second memory region; determining data that changes after the processing in the second memory region; and transmitting, to the client, the data that changes after the processing, such that the client updates the data in the first memory region based on the mapping.

According to a fourth aspect of the present disclosure, there is provided a device for managing a distributed system. The device comprises: one or more processors; a memory coupled to at least one of the one or more processors; computer program instructions stored in the memory which, when executed by the at least one processor, cause the device to perform the following acts, comprising: in response to determining that data in a first memory region of a client in the distributed system changes, transmitting data that changes to a server in the distributed system, so that the server updates data in the second memory region using the data that changes based on a mapping between the first memory region and the second memory region of the server; transmitting, to the server, a calling request for a computing node in the server, so that the computing node performs a processing based on the data that changes in the second memory region; and in response to receiving, from the server, the data that changes in the second memory region after the processing, updating the data in the first memory region based on the mapping.

According to a fifth aspect of the present disclosure, there is provided a computer program product tangibly stored on a computer readable medium and including machine executable instructions which, when executed by a machine, cause the machine to perform the method according to the first aspect of the present disclosure.

According to a sixth aspect of the present disclosure, there is provided a computer program product tangibly stored on a computer readable medium and including machine executable instructions which, when executed by a machine, cause the machine to perform the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference symbol generally refers to the like element in the example embodiments of the present disclosure.

DETAILED DESCRIPTION

Figure 1:
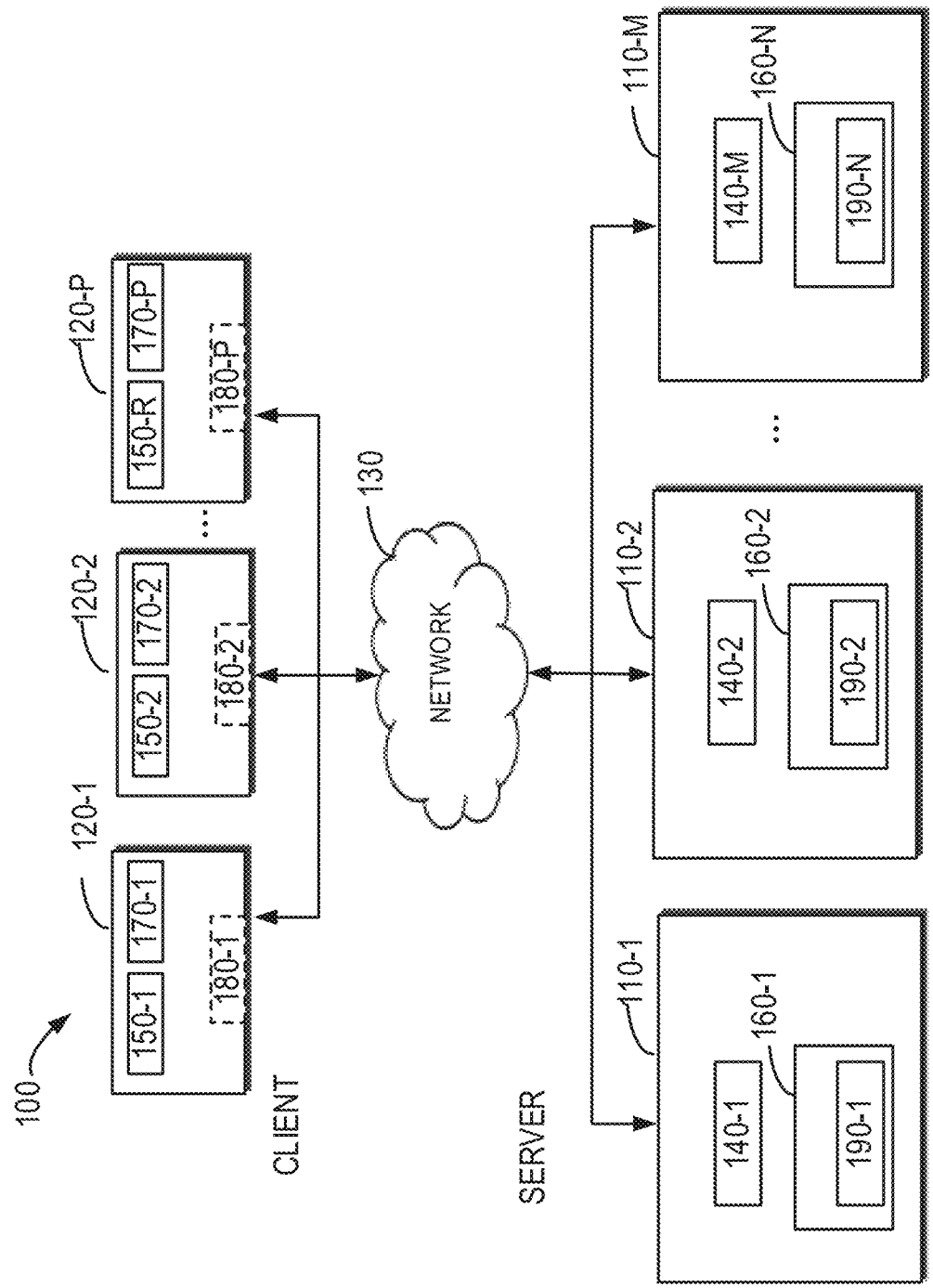
FIG. 1 is a block diagram illustrating an example distributed system 100 suitable to implement the embodiments of the present disclosure.

The preferred embodiments of the present disclosure will be described in more details with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text can also include other explicit and implicit definitions.

As depicted above, computing nodes may be located locally at a client or provided by a remote machine or a system. In some examples, it may be deployed in a cloud-based distributed system which includes a plurality of machines having one or more computing nodes. The computing nodes of the distributed system may be used by different clients as needed.

FIG. 1 is a block diagram illustrating an example distributed system 100 suitable to implement the embodiments of the present disclosure. The distributed system 100 may comprise one or more hosts, including a host 110-1, a host 110-2, . . . , a host 110-M (hereinafter collectively or individually referred to as a host 110, where M is a natural number). Each host 110 has a corresponding memory 140-1, 140-2, . . . , 140-M (hereinafter collectively or individually referred to as a memory 140). The distributed system 100 further comprises one or more computing nodes 160-1, 160-2, . . . , 160-N (hereinafter collectively or individually referred to as a computing node 160, where N is a natural number). Each computing node 160 has a corresponding video memory 190-1, 190-2, . . . , 190-N (hereinafter collectively or individually referred to as a video memory 190).

In the example shown in FIG. 1, the host 110-1 has the computing node 160-1, the host 110-2 has the computing node 160-2 and the host 110-M has the computing node 160-N. It shall be understood that the present disclosure does not limit that each host only has one computing node; instead, one host may have one or more computing nodes. Therefore, it is possible that the values of M and N are not the same.

In the context of the present disclosure, examples of the computing node 160 may include, but are not limited to, a graphics computing node (GPU), a field programmable gate array (FPGA), and the like. For ease of discussion, some implementations will be described taking a GPU as the computing node 160 as an example. Apart from the computing node 160, the host 110 may further include one or more general-purpose processing units (not shown), such as a central processing unit (CPU).

FIG. 1 further illustrates a plurality of clients 120-1, 120-2, . . . , 120-P (hereinafter collectively or individually referred to as a client 120, where P is a natural number greater than 1), each respectively having a memory 170-1, 170-2, . . . , 170-P (hereinafter collectively or individually referred to as a memory 170) and applications to be run 150-1, 150-2, . . . , 150-R (hereinafter collectively or individually referred to as an application 150, where R is a natural number greater than 1). The application 150 may be any application that can be run on the client 120 and the application may be designed to perform the corresponding data processing or analyzing tasks. As an example, the application 150 may perform data processing or analyzing tasks associated with machine learning or deep learning. As shall be understood, each client 120 is not limited to have only has one application 150, instead, one client 120 may have one or more applications 150. Therefore, it is possible that the values of P and R are not the same.

Since the price of GPUs is high, if a user only performs computation using local GPU resources statically, the GPU resources cannot be utilized efficiently. In this case, GPU as a Service (GPUaaS) can be used. GPUaaS refers to the provision of a GPU function as a remote service to a local application by constructing a client-server model, thereby improving the overall utilization rate of the GPU resources and reducing costs.

In such an implementation, the client 120 may be connected to one or more hosts 110 over a network 130 and pass data of the application 150 to be run by one or more computing nodes 160 of the host 110. In particular, the client 120, instead of having a GPU, may present a virtual GPU interface 180 to the user, which is represented by 180-1, 180-2, . . . , 180-P in FIG. 1. All the local calls of the application 150 for the GPU are intercepted and sent to a real GPU at the server which calls a real GPU function at the real GPU hardware to process and return a result to the client 120 over the network 130 and the interface 180.

For the sake of clarity and conciseness of depiction, a GPU will be used as a main example to depict example embodiments of the present disclosure. However, it is to be understood that a GPU is merely an example computing node and not intended to limit the scope of the present disclosure. Spirits and principles described herein may be applied to other computing nodes, such as computing nodes in an accelerator like a field programmable gate array (FPGA), regardless of whether they are currently known or to be developed in the future, and is not limited to GPU kernels. In addition, for ease of depiction, "server" and "host" may be used hereinafter interchangeably.

As mentioned above, GPUaaS provides GPU functions as a service by means of building a client-server model. As shown in FIG. 1, one or more clients 120-1, 120-2 through 120-P in the distributed system 100 may not contain a computing node such as a GPU, but only include a GPU interface 180 communicating with a remote GPU. The distributed system further contains one or more hosts 110 serving as a server for GPUaaS, inside which there is a real computing node 160, for instance, a GPU. The client 120 is connected with the host 110 over the network 130 and the host provides GPUaaS service to the client 120, namely, process GPU tasks transmitted by the client 120 to the host 110, for example, executing a GPU computation. The network 130 may be any computer network currently known in the art or to be developed in the future, such as an Internet, a Local Area Network, a Metropolitan Area Network and an Intranet. In the distributed system 100, the client 120 may transmit requests for processing GPU tasks to the host 110 over the network 130 and receive processing results of the GPU tasks from the host 110.

Figure 2:
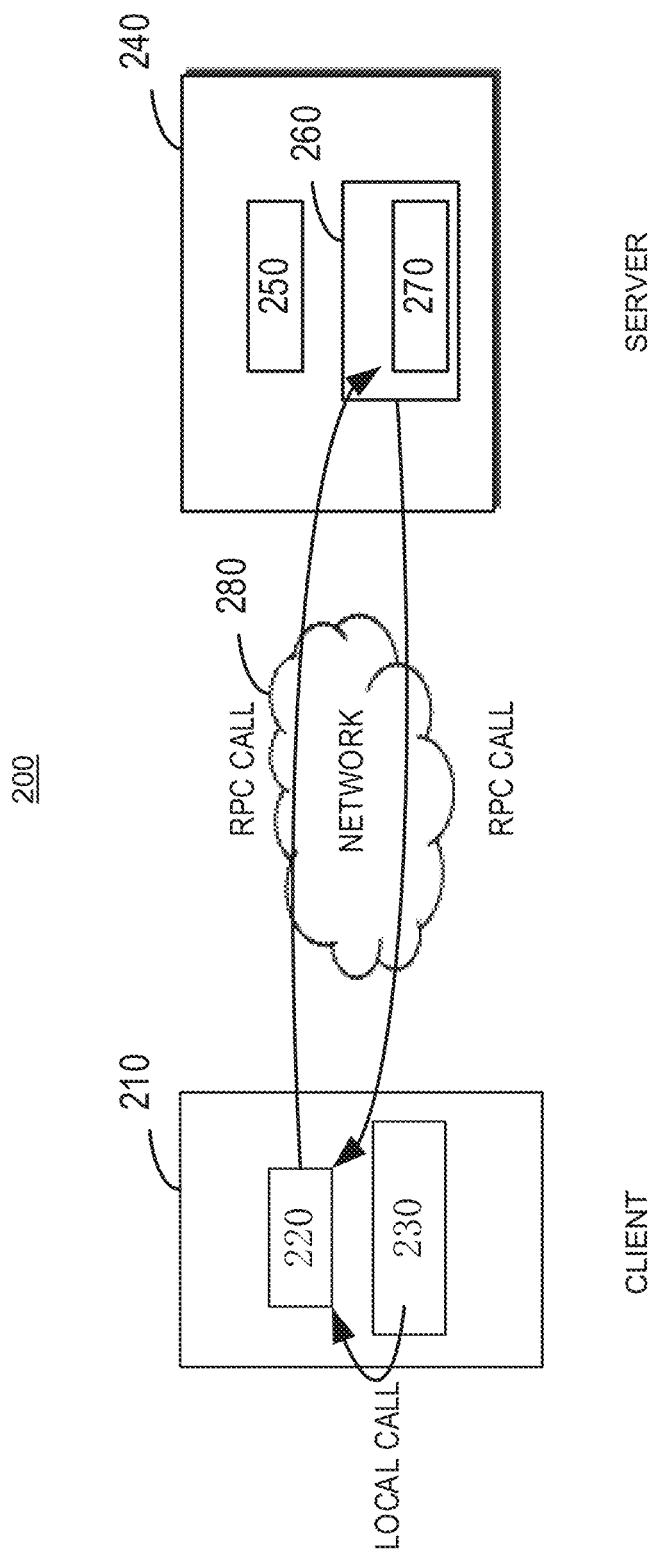
FIG. 2 is a schematic diagram schematically illustrating operations executed in an application of a distributed system in accordance with a technical solution.

In the distributed system 100, the client 120 serves as a client for GPUaaS and the host 110 may be considered as a server. In some embodiments of the present disclosure, the client-server model may execute the above interactive process using a remote process calling (RPC) protocol or similar protocols. An RPC channel needs to be built between a client and a server so as to transmit a request for processing a GPU task or the processing result of the GPU task, for example, in the form of a GPU command list in which each command represents a corresponding GPU function, such as calling of application programming interface (API) of a compute unified device architecture (CUDA), specifically including commands memcpyH2D, runGPUfunction and memcpyD2H etc. As shown in FIG. 2, in a typical implementation of the GPUaaS, an application of a client executes a three-step process.

FIG. 2 is a schematic diagram illustrating an operation implemented by an application in a distributed system according to a technical solution. As illustrated in FIG. 2, a conventional GPUaaS-based distributed system 200 includes a client 210 and a server 240 in which the client 210 has a memory 230 while the server 240 has a memory 250 and a GPU 260 which further includes a video memory 270. The application 220 in the client 210 injects commands and data of the operation desired to be executed by a GPU into the memory 230 local to the client 210. The client 210 does not have a GPU but transmits GPU commands and data to the server 240 through a network 280 based on a remote process calling protocol and calls the real GPU 260 in the server 240 to process. Subsequently, a processing result obtained by the server 240 is returned to the client 210 via the network 280 still based on the remote process calling protocol, stored in the local memory 230 and provided to the application 220.

Based on the typical implementation of GPUaaS described above, it is possible to utilize GPUs with lower costs and higher utilization rates. However, with the rapid development of the GPUaaS technology, a major problem exists in that the data amount processed by current GPU operations becomes increasingly greater, for example, the amount of training data for a neural network becomes larger and larger, and the layers of a deep learning model become deeper and deeper. In addition, the growth rate of processing performance of GPUs is greater than that of CPU performance, and the transmission speed of external connections increases, meanwhile, the size of GPU video memory of the GPUs does not significantly increase accordingly. As such, the performance of the overall distributed system will be affected by the gradual saturation of the transmission capability of networks and memory capacity.

In view of the above defects in existing technologies, it is desired to develop a technical solution that can reduce operating overhead of a GPUaaS-based distributed system and can effectively improve the management level of an internal memory. According to some embodiments of the present disclosure, there is provided a method of managing a distributed system used in distributed system 100. More details of the method of managing the distributed system executed by the example distributed system will be described below with reference to FIG. 1.

To simplify depictions, an example where there is only one client 120 at a client and one server 110 at a server will be used in the following for description, but the present disclosure may also have more than one client 120 and more than one server 110.

It shall be easily understood that an internal video memory of a GPU generally has a high access speed and can provide to the GPU with high-speed storage access to data needed by current computation. However, compared with the memory 140 of a host external to a GPU 160, the capacity of the video memory is generally small. For example, a customary video memory generally has a capacity of 8 G-32 G, while the memory of a host itself is generally even greater, as large as a few hundred gigabytes or even larger. With the development of technologies such as machine learning and deep learning, the amount of data that GPUs need to process will increase dramatically, while the limited capacity of the video memory of a GPU sometimes causes problems like insufficient memory or overflow.

For a host containing a GPU computation node, there already exists a scheme based on a unified memory access (UMA) technology. In this traditional UMA scheme, the host's own memory and video memory are managed uniformly and share the same memory address space. For the host's own CPU or GPU, data in the video memory or host memory is accessed by means of mapping between virtual addresses and real addresses in a page table, while a user does not need to care about how the memory space inside the host is managed. Then, for the GPU inside the host, the storage space available will not be limited to a video memory per se but will be enlarged notably, thereby reducing the risk caused by a capacity limit of a memory.

The traditional UMA scheme is generally suited for GPU computation executed inside a single host. For a GPUaaS-based distributed system, it needs to adopt a special mechanism different from the local UMA scheme to realize memory management and data transmission management of the client and the server. With regard to the above scenario, the embodiments of the present disclosure provide an optimized method for memory management which supports UMA in GPUaaS.

According to the method provided in the embodiments of the present disclosure, first, in response to receiving data that changes in a first memory region of a client in a distributed system, data in a second memory region is updated with the received data based on a mapping between the first memory region and the second memory region of a server in the distributed system. Then, in response to receiving from the client a calling request for a computing node in the server, the computing node performs a processing based on the updated data in the second memory region. Subsequently, the data that changes in the second memory region after the process is determined. Furthermore, the data that changes after the processing is transmitted to the client, so that the client updates data in the first memory region based on the mapping.

Based on the above scheme provided in the embodiments of the present disclosure, it is possible to support UMA memory management in the GPUaaS operation mode and improve the performance of the system.

According to some embodiments of the present disclosure, once an application 150 (for instance, a UMA application) of a client 120 allocates memory space (for example, the first memory region) in its internal memory 170, under the UMA operation mode of the GPUaaS, the application will take over the UMA memory allocation and trigger the establishment of a dual mapping between the first memory region of the client 120 and the second memory region of the server 110 so as to construct two memory regions that mirror each other in the client 120 and the server 110. The first memory region of the client 120 is entirely located in the local memory 170, while the second memory region in the server 110 adopts a UMA scheme, including its internal memory 140 and the video memory 190 in the GPU.

According to some embodiments of the present disclosure, the first memory region and the second memory region are respectively divided into a plurality of storage entries, while each storage entry may be further divided into a plurality of storage blocks, where each storage entry in the first memory region and each corresponding storage entry in the second memory region are in one-to-one correspondence, and each storage block in each storage entry in the first memory region and each storage block in each storage entry in the second memory region are also in one-to-one correspondence so as to establish a fine-grain mapping based on storage blocks between the first memory region and the second memory region. It is to be understood that the storage blocks in the first memory region and the storage blocks in the second memory region have the same size and the size of the divided storage blocks may be configured flexibly. For example, each storage block may have a size of 1 M~8 M. More details on memory management and data management in the distributed system will be described in detail below with reference to FIG. 3.

Figure 3:
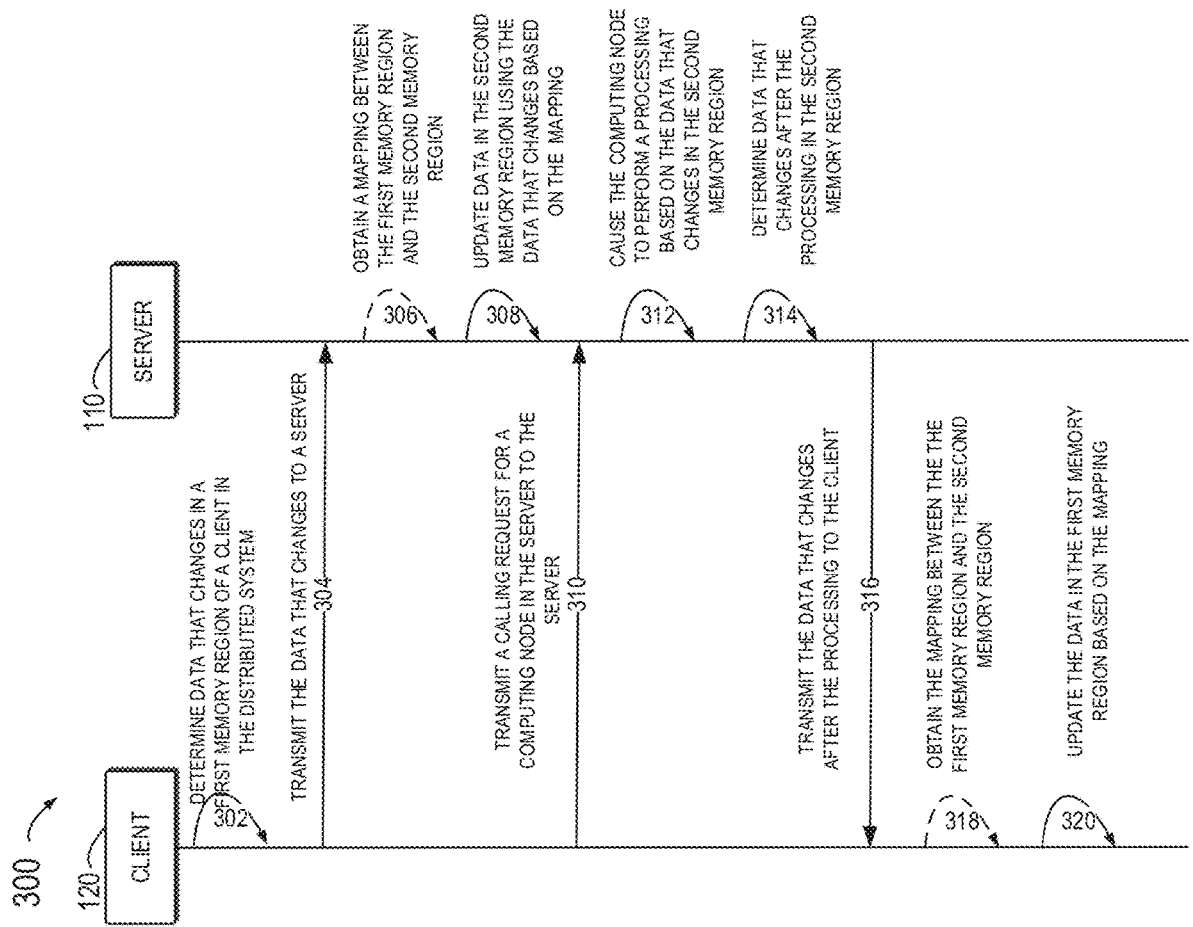
FIG. 3 is a schematic diagram illustrating interactions between a client and a host in a distributed system according to some embodiments of the present disclosure.

FIG. 3 is a schematic diagram 300 illustrating interactions between a client 120 and a host 110 in a distributed system 100 according to some embodiments of the present disclosure. It is to be understood that the term "host" may be used interchangeably with "server" herein.

First, the client 120 determines 302 that data in the first memory region in its internal memory 170 is changed. This change may be generated, for instance, when an application 150 in the client 120 injects data to be processed by a GPU 160 into the memory 170 local to the client 120. In one embodiment of the present disclosure, the client 120 performs a comparison based on a storage entry to determine whether one or more pieces of data in the storage entry are changed. In some other embodiments, the client 120 determines whether one or more storage blocks change based on a comparison of storage blocks.

According to some embodiments of the present disclosure, it may be determined whether the data in storage block changes based on a secure hash algorithm (SHA). For example, a hash table may be maintained for a first memory region in the client 120, which stores the current hash value of each block respectively in the first memory region. If the data in one or more storage blocks is changed, the corresponding hash value is changed accordingly. By comparing the previous hash value with the current hash value of the storage block, it may be determined whether the data in the storage block has been changed.

According to some embodiments of the present disclosure, the hash table may be maintained based on software and it is determined whether the data in the storage block is changed. According to some other embodiments of the present disclosure, it may be determined whether the data in the storage block is changed without maintaining a hash table but instead by directly obtaining information about an access operation that has been performed and to which storage blocks based on a tracking operation to the storage block in the memory by the kernel layer of the operating system. This approach is potentially more efficient than the SHA scheme.

Subsequently, in response to determining that its internal data changes, the client 120 transmits 304 the data that changes to a server 110 over a network 130 so as to be processed by a GPU subsequently. According to some embodiments of the present disclosure, the data that changes is transmitted from the client 120 to the server 110 in a unit of storage block.

Additionally or alternatively, after the server 110 receives data transmitted from the client 120, the mapping between the first memory region and the second memory region is obtained 306. As can be known from the above, this mapping is fine-grained and is based on a correspondent relation of each storage block.

Then, the server 110, based on the mapping between the first memory region and the second memory region, updates 308 data in the corresponding storage block in the second memory region based on the received data that changes in the storage block. Through the above operations, data synchronization from the client 120 to the server 110 is realized, also referred to as dirty page synchronization. It shall be understood easily that the dirty page refers to the storage block in which data has been changed.

The process of dirty page synchronization based on a mapping is performed in the unit of a storage block. In some examples of the present disclosure, firstly, at least one storage block in the first memory region associated with the data received from the client 120 may be determined. Then, based on the mapping, a storage block corresponding to the at least one storage block is determined from the second memory region. Finally, for the corresponding storage block determined in the second memory region, the data in each storage block is updated block by block using the data received from the client 120.

After the dirty page synchronization is completed, the client 120 transmits 310 to the server 110 a calling request for the computing node 160 in the server 110. This request, for instance, may be implemented through the remote process calling described above. In response to receiving the calling request for the computing node 160 in the server 110 from the client 120, the server 110 causes 312 its internal computing node to process based on the updated data in the second memory region. It shall be understood easily that the data to be processed at this time is stored in the memory 140 of the server 110 owned by itself and the video memory 190 inside the computing node 160 in a manner of UMA and is called by the computing node 160 in a unified manner.

The computing node 160 will process data to be processed by calling various GPU kernel functions. Customary processing may include one or more of machine learning, deep learning, neural network training and high-performance computing, and is not limited herein. The processing result of the computing node 160 will still be stored in the second memory region of the server 110.

Subsequently, the server 110 determines 314 the data in the second memory region that has been changed after the processing. The specific manner of determining data that changes may be similar to the manner of determining data that changes implemented at the client 120 previously. It is easy to understand that a comparison based on a storage block may be performed at the server 110 to determine whether one or more of the storage blocks in the second memory region have been changed. In addition, it is also possible to determine whether the data in the storage blocks in the second memory region has been changed based on a secure hash algorithm. In an example, the hash values of one or more storage blocks before processing and after processing in the hash table may be compared to determine the data in which storage blocks has been changed.

Then, the server 110 transmits 316 the data that changes after the process to the client 120 over the network 130 for returning the computing result of the computing node 160 to the client 120. According to some embodiments of the present disclosure, the data that changes in the storage block in the second memory region is transmitted from the server 110 to the client 120 in the unit of storage block.

After the client 120 receives the data that changes after the process transmitted from the server 110, this data is utilized to complete a backward dirty page synchronization process (namely, synchronization from the server 110 to the client 120). This process is inverse to the aforementioned dirty page synchronization process (namely, synchronization from client 120 to server 110, hereinafter also referred to as forward dirty page synchronization process), which will be depicted in more details as below with reference to FIGS. 4A, 4B, 5A and 5B. Additionally or alternatively, after the server 110 receives the data transmitted from the client 120, it may obtain 318 the mapping between the first memory region and the second memory region.

Finally, the client 120 updates 320 the data in the corresponding storage block in the first memory region utilizing the data of the storage block that changes and is transmitted from the server 110, based on the mapping between the first memory region and the second memory region, so as to complete the backward dirty page synchronization process. The updated data in the client 120 will be stored in the memory 170 local to the client 120 and be provided to the application 150 in the client 120.

Thus, in some embodiments of the present disclosure, a three-step GPU calling method and the corresponding management method of a distributed system are provided, in which, at a first step, the data to be processed is injected into the client and the dirty page of the client is synchronized in a forward direction to the server; at the second step, a GPU is utilized to process at the server; and at the third step, the dirty page of the server is synchronized in a backward direction to the client. It is easy to understand that this three-step processing method may be performed cyclically between the client and the server.

As a large number of cyclical iterative processes generally exist in the current customary various computation processing implemented by GPUs, the three-step processing process described herein is very suitable for computation processing implemented based on GPUs. It shall be understood easily that since each time when a GPU is called for processing, only data that changes in the storage blocks is synchronized, thereby, compared to the GPU calling in the traditional GPUaaS, this approach can reduce the amount of transmission of data significantly and alleviate the impact on the performance of data transmission networks. In addition, there exists two memory regions that are mirror to each other between the server and the client, and owing to the existence of fine-granular mapping between memory regions, therefore, after one cycle, the data at the client can be updated very quickly and when the application of the client determines that it is necessary to perform a processing process of a next cycle, the data at the client may be synchronized to the server quickly and be processed by a GPU, thereby improving the performance of the distributed system.

An interactive process between the server 110 and the client 120 in the distributed system is described above with reference to FIG. 3 according to some embodiments of the present disclosure. The schematic diagrams of a fine-granular memory mapping will be described below with reference to FIGS. 4A, 4B, 5A and 5B according to some embodiments of the present disclosure.

Figure 4A:
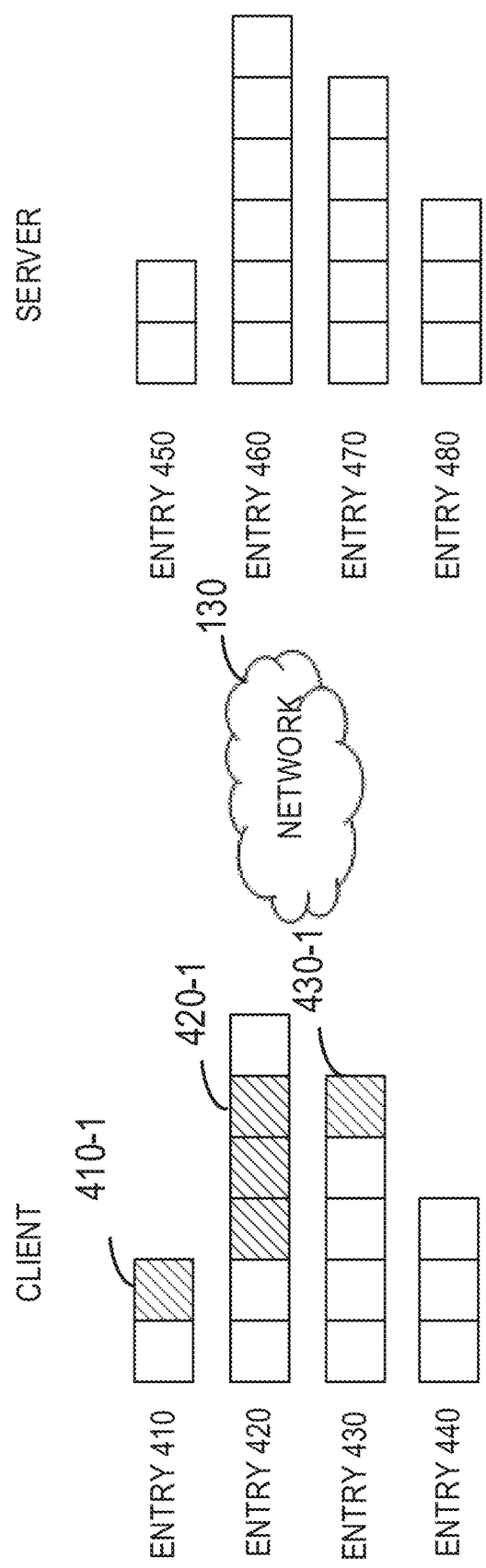
FIGS. 4A and 4B are schematic diagrams illustrating forward dirty page synchronization based on a fine-grain memory mapping according to some embodiments of the present disclosure.
Figure 4B:
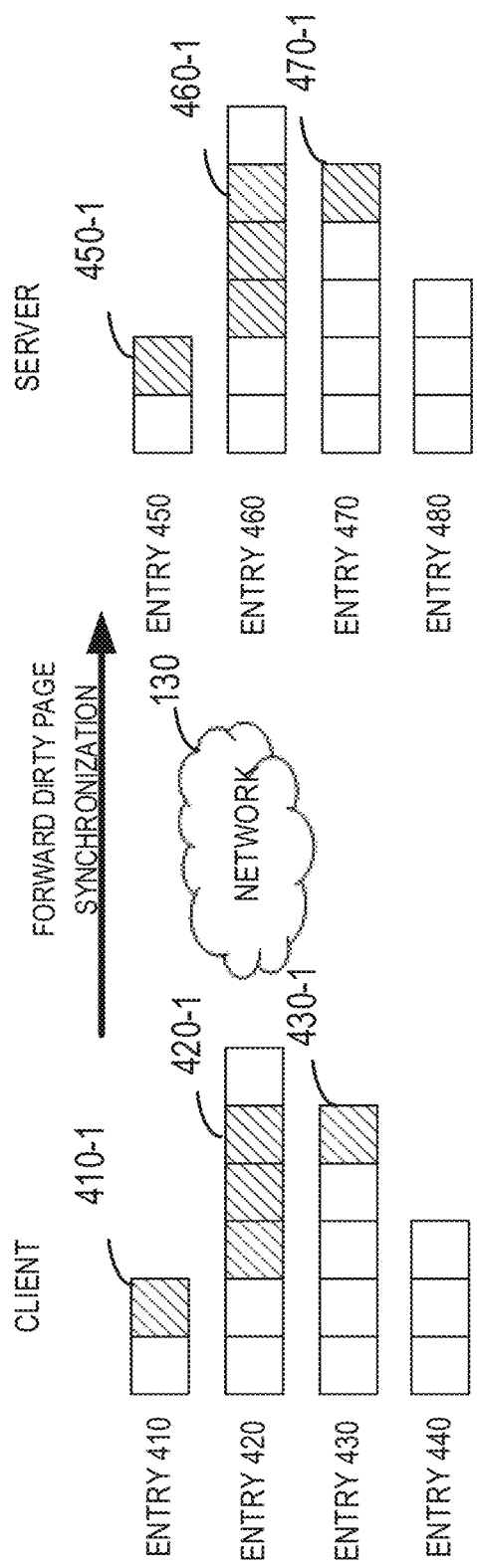

FIGS. 4A and 4B are schematic diagrams of realizing forward dirty page synchronization based on the fine-granular memory mapping according to some embodiments of the present disclosure. As shown in FIG. 4A, there are a plurality of storage entries 410 to 440 in the first memory region of the client 120, each entry having one or more storage blocks, respectively. As can be seen from FIG. 4A, the entry 410 has at least a storage block 410-1, the entry 420 has at least a storage block 420-1 and the entry 430 has at least a storage block 430-1. Meanwhile, at server 110, there is the second memory region mirrored to the first memory region, which also has a plurality of storage entries 450 to 480, each entry also having one or more storage blocks. As can be seen from FIG. 4B, the entry 450 has at least a storage block 450-1, the entry 460 has at least a storage block 460-1 and the entry 470 has at least a storage block 470-1. All the storage blocks in the first memory region and the second memory region have the same size. It can be known from the preceding depiction that a fine-granular mapping based on storage block is established between the first memory region and the second memory region. In response to the application 150 of the client 120 injecting computing data to the first memory region in its internal memory 170, some storage blocks (for instance, 410-1) in some entries of the first memory region will be changed. By comparing the hash values before and after the change of each storage block, it may be known easily the data in which storage block has been changed.

As shown in FIG. 4B, the client 120 transmits data determined to have been changed in the storage block to the server 110 and updates the corresponding storage block in the second memory region of the server 110. In particular, the server 110 will first determine at least one storage block (such as 410-1) in the first memory region associated with the data received from the client 120 and determine the storage block (such as 450-1) corresponding to the at least one storage block of the first memory region in the second memory region based on the above fine-granular mapping. Then, the data in the storage block determined from the second memory region is updated with the data of storage block that changes and that is received from the client 120. As such, the process of the forward dirty page synchronization is realized.

Figure 5A:
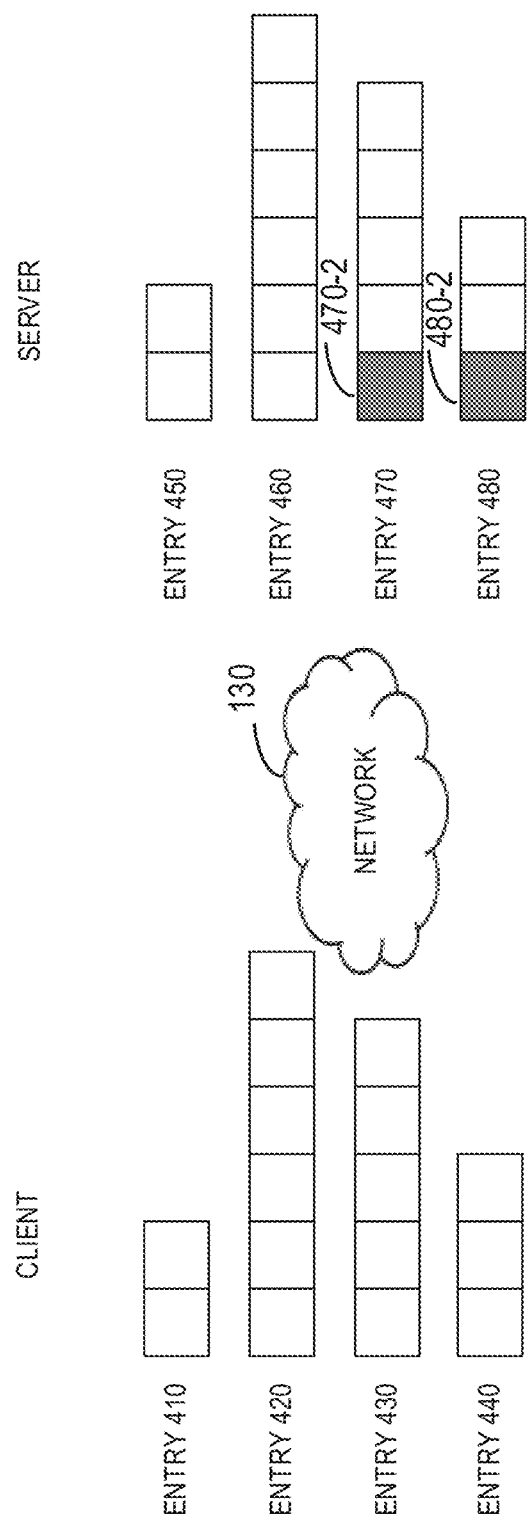
FIGS. 5A and 5B are schematic diagrams illustrating backward dirty page synchronization based on a fine-grain memory mapping according to some embodiments of the present disclosure.
Figure 5B:
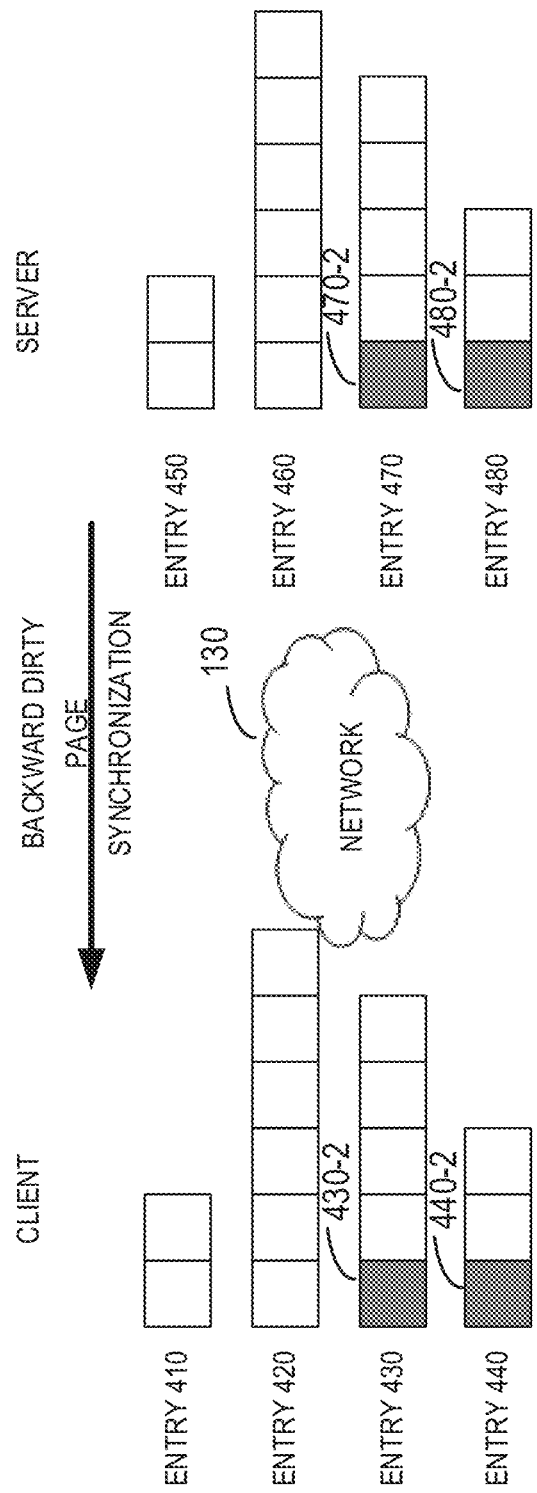

FIGS. 5A and 5B are schematic diagrams illustrating backward dirty page synchronization based on a fine-granular memory mapping according to some embodiments of the present disclosure. The process of backward dirty page synchronization is similar to the process of forward dirty page synchronization. Referring to FIG. 5A, after the computing node 160 in the server 110 performs computation processing for the updated data in the second memory region, the result will be stored in the second memory region so that some storage blocks (such as 470-2 and 480-2) in some entries in the second memory region will be changed. By comparing the hash values of each storage block before and after processing, it can be known easily the data in which storage block has been changed.

As shown in FIG. 5B, the server 110 transmits the data in the storage block determined as being changed to the client 120 and updates the corresponding storage block in the first memory region of the client 120. In particular, the client 120 will determine at least one storage block (such as 470-2, 480-2) in the second memory region associated with the data that changes and that is received from the server 110 and determine the storage block (for instance, 430-2, 440-2 etc.) corresponding to the at least one storage block in the second memory region from the first memory region based on the above fine-granular mapping. Thereafter, the data in each of the storage blocks determined from the first memory region is updated with the data of each of the changed storage blocks received from server 110. As such, the process of the backward dirty page synchronization is realized.

Based on the process of forward dirty page synchronization and backward dirty page synchronization proposed herein, only data that changes is synchronized between the client 120 and the server 110 each time, so that the GPUaaS scheme can be realized with lower transmission costs, and network transmission bandwidth can be saved effectively thereby improving the performance of the system.

According to some embodiments of the present disclosure, a method of managing a distributed system implemented in a server 110 of the distributed system 100 is provided. More details of the example method of managing the distributed system will be described below with reference to FIG. 6.

Figure 6:
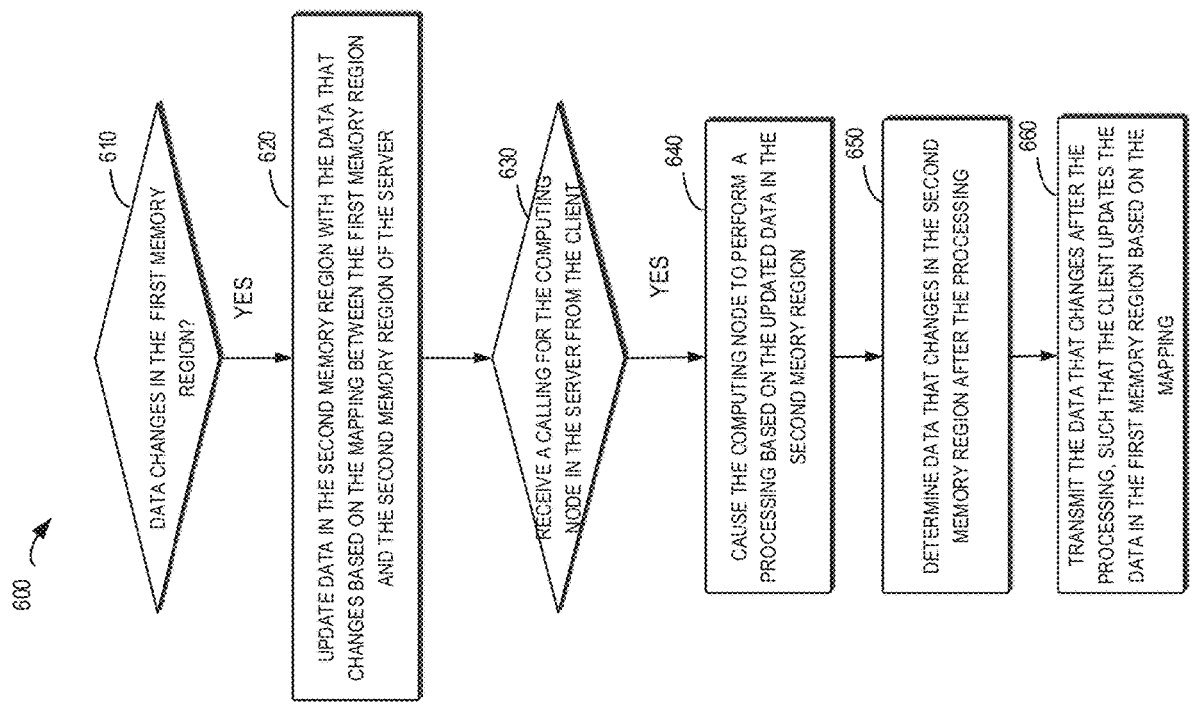
FIG. 6 is a flowchart illustrating a method of managing a distributed system in a server of a distributed system according to some embodiments of the present disclosure.

FIG. 6 is a flowchart illustrating a method 600 of managing a distributed system in server 110 of the distributed system 100 according to some embodiments of the present disclosure. The method of managing a distributed system in the server 110 will be depicted with reference to FIG. 6 in combination with FIGS. 1 and 3. As shown FIG. 6, at block 610, the server 110 determines whether data that changes in the first memory region is received from the client 120. It can be seen from the above description, the received data is the data from the client 120 and to be processed by the computing node 160 in the server 110. If it is determined that the changed data in the first memory region of the client 120 is received, proceed to block 620.

At block 620, data in the second memory region is updated with the received data so as to complete the forward dirty page synchronization based on the mapping between the first memory region and the second memory region of the server 110. It is to be understood that the second memory region is a memory region managed based on a UMA approach in the server 110, which includes the region in the memory 140 of the server 110 itself and the region in the video memory 190 of the computing node 160 in the server 110.

Additionally or alternatively, before the data in the second memory region is updated, there further exists a step of obtaining the mapping between the first memory region and the second memory region. In some embodiments, this mapping may be pre-stored in the server 110. In some other embodiments, this mapping may be pre-stored in the client 120 and be transmitted to the server 110 together with data transmitted from the client 120.

It is easy to understand that the mapping between the first memory region and the second memory region is generally already established when the first memory region in the client 120 is created. According to some embodiments of the present disclosure, the mapping between the first memory region and the second memory region may be obtained in the following manner: dividing the first memory region respectively into a first group of storage blocks, and dividing the second memory region respectively into a second group of storage blocks corresponding to the first group of storage blocks, where the storage blocks of the second group have the same sizes as the storage blocks of the first group. Then, the mapping between the first group of storage blocks and the second group of storage blocks is established.

After the mapping is obtained, the server 110 may execute an updating of data in the second memory region conveniently. According to some embodiments of the present disclosure, at least one storage block in the first memory region associated with data received from the client 120 is determined, and then, the storage block corresponding to the at least one storage block of the client 120 is determined from the second memory region based on the mapping. Subsequently, the data determined in each storage block in the second memory region may be updated with the data received from the client 120.

The data changes at the client 120 may be transmitted to the server 110 efficiently based on the process of the forward dirty page synchronization described above, which is particularly useful when the data changes at the client 120 is not in big ratio, thereby reducing the occupancy of network bandwidth significantly.

Then, at block 630, the server 110 determines whether a calling request for the computing node 160 in the server 110 is received from the client 120. The calling request is generally received at server 110 immediately after the forward dirty page synchronization is completed. If the calling request for the computing node 160 is received, proceed to block 640.

At block 640, the server 110 uses the computing node 160 to process based on the updated data in the second memory region. The executed processing may be any computing process suitable for a GPU operation, and is not limited herein in the disclosure. The processing result is also stored in the second memory region.

At block 650, the server 110 determines which storage blocks in the second memory region have been changed after processing. This change may be determined based on, for instance, a SHA algorithm. For example, the server 110 may determine which storage blocks are changed in the second memory region by comparing the hash values of storage blocks and determining which storage block has been changed before and after the processing.

According to some embodiments of the present disclosure, it may be determined which storage block in the second memory region has been changed in the following manner: first, obtaining the first hash value before processing and the second hash value after processing of at least one storage block in the second memory region. Then, if it is determined that the first hash value is different from the second hash value, then it can be determined that the data in at least one storage block has been changed. By means of comparing hash values, information about which storage block has been changed can be obtained efficiently.

At block 660, the server 110 transmits the data that is changed after the processing to the client 120, so that the client 120 updates the data in the first memory region based on the mapping, so as to realize the backward dirty page synchronization. In this way, the processing result of GPU computing performed by the computing node 160 of the server 110 may be returned to the application 150 in the client 120.

It shall be understood easily that in the embodiments described above, the second memory region in the server 110 includes a third memory region inside the computing node 160 and a fourth memory region outside the computing node 160 (namely, the memory of server 110), the third memory region and the fourth memory region being managed in a unified manner based on the UMA method.

The method of managing a distributed system implemented in the server 110 in the distributed system 100 has been described above. According to the method implemented in the server 110 described above, the UMA memory management in the GPUaaS operation mode may be supported effectively and the transmission capability of the network of the entire distributed system can be improved effectively and the problem of memory capacity bottleneck can be mitigated, thereby improving the performance of the entire system.

According to some other embodiments of the present disclosure, there is provided a method of managing a distributed system implemented at client 120 in the distributed system 100. More details of the example method of managing the distributed system will be described below with reference to FIG. 7.

Figure 7:
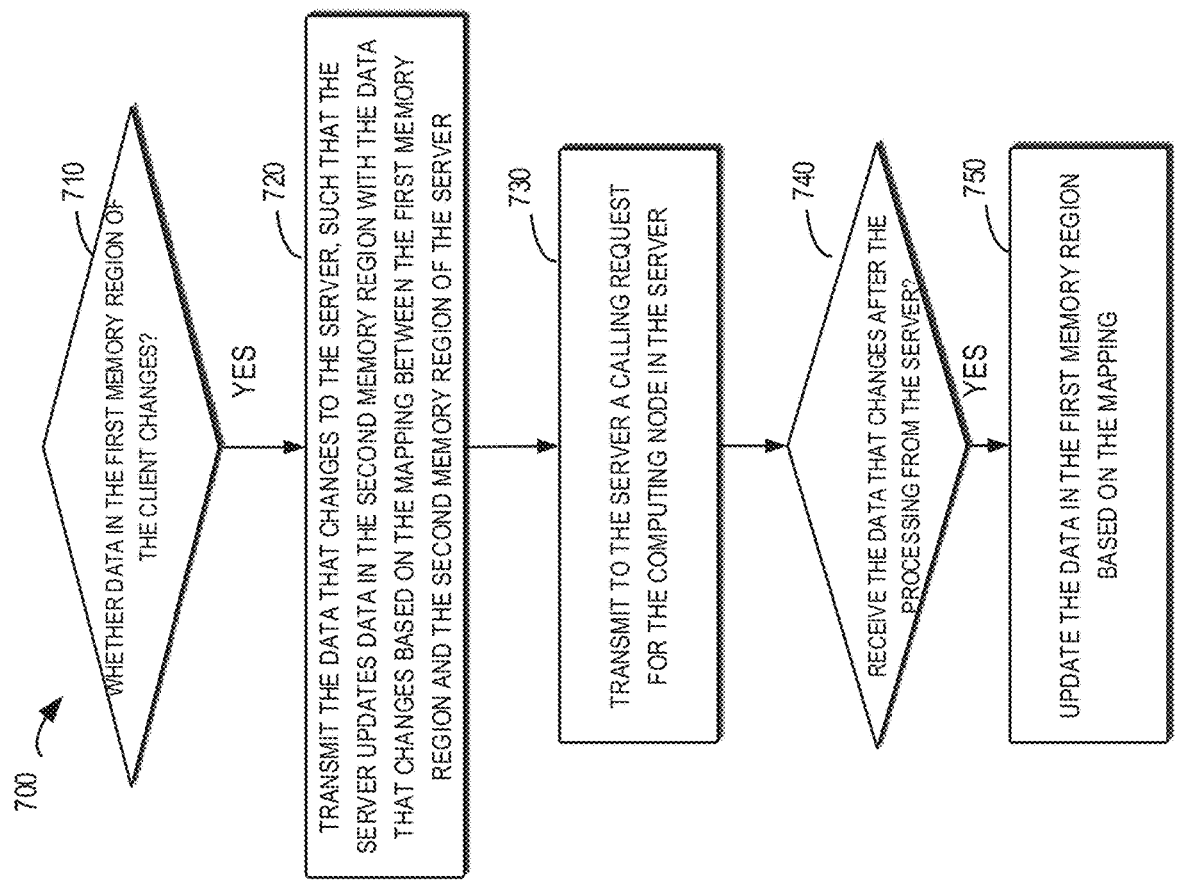
FIG. 7 is a flowchart illustrating a method of managing a distributed system in a client of a distributed system according to some embodiments of the present disclosure.

FIG. 7 is a flowchart illustrating a method 700 of managing a distributed system in a client 120 of a distributed system 100 according to some embodiments of the present disclosure. The method of managing a distributed system in the client 120 will be described with reference to FIG. 7 and in combination with FIGS. 1 and 3. As shown in FIG. 7, at block 710, the client 120 determines whether the data in the first memory region is changed. Based on the above depiction, it can be known that this change may be generated, for instance, when an application 150 in the client 120 injects data to be processed by a GPU 160 in a memory 170 local to the client 120. According to some embodiments of the present disclosure, if it is determined that the hash value of at least one storage block in the first memory region is changed, it is determined that data in the at least one storage block is changed. It shall be understood easily that the information about which storage block has been changed can be obtained efficiently by comparing hash values. If it is determined that the data in the first memory region has been changed, proceed to block 720.

At block 720, the client 120 transmits the data that changes to the server 110 in response to determining that data in its first memory region is changed, so that the server 110 updates data in the second memory region with the received data based on the mapping between the first memory region and the second memory region in the server 110, thereby completing the forward dirty page synchronization.

Then, at block 730, after the completion of the dirty page synchronization, the client 120 transmits, to the server 110, a calling request for the computing node 160 in the server 110. The calling request generally has a form of remote process calling to cause the computing node 160 to process with the updated data in the second memory region. The processing result will also be stored in the second memory region.

At block 740, the client 120 determines whether received data is the data that changes after the process in the second memory region from the server 110. This change, for example, may be determined based on the SHA algorithm. For instance, the server 110 may determine the storage block that changes in the second memory region by comparing the hash values of the storage blocks to determine which storage block has changed before and after processing.

At block 750, in response to receiving the data that changes, the client 120 updates the data in the first memory region based on the mapping so as to realize the backward dirty page synchronization. In this way, the processing result of GPU computation executed by the computing node 160 of server 110 may be returned to the application 150 in the client 120.

According to some embodiments of the present disclosure, before the data in the first memory region is updated, there further exists a step of obtaining the mapping between the first memory region and the second memory region. In some embodiments, this mapping may be pre-stored in the client 120. In some other embodiments, this mapping may be pre-stored in the server 110 and be transmitted with the data transmitted by the server 110 to the client 120.

It is easy to understand that the mapping between the first memory region and the second memory region is generally already established when the first memory region in the client 120 is created. According to some embodiments of the present disclosure, the following approach may be utilized to obtain the mapping between the first memory region and the second memory region: divide the first memory region respectively into a first group of storage blocks and divide the second memory region respectively into a second group of storage blocks corresponding to the first group of storage blocks, where the second group of storage blocks and the first group of storage blocks have the same size, respectively. Subsequently, the mapping between the first group of storage blocks and the second group of storage blocks is established.

After the mapping is obtained, the client 120 may implement updating of data in the first memory region conveniently. According to some embodiments of the present disclosure, the following approach may be employed to update the data in the first memory region: first, determine at least one storage block in the second memory region associated with data that changes and received from the server. Then, based on the obtained mapping, the storage block corresponding to the at least one storage block is determined from the first memory region. Subsequently, data in each storage block determined from the first memory region is updated using changed data received from the server 110.

Based on the processing of backward dirty page synchronization described above, the data that changes at server 110 may be transmitted to the client 120 efficiently, which is particularly useful when the data that changes at server 110 is not in a big ratio, thereby reducing the occupancy of network bandwidth significantly.

The method of managing a distributed system implemented by a server and a client has been depicted respectively from the perspective of the server and the client based on FIGS. 6 and 7. The method of managing a distributed system proposed herein can support the UMA memory management in a GPUaaS operation mode more effectively, improve the network transmission capability of the overall distributed system and alleviate the memory capacity bottleneck problem, thereby improving the performance of the entire system.

Figure 8:
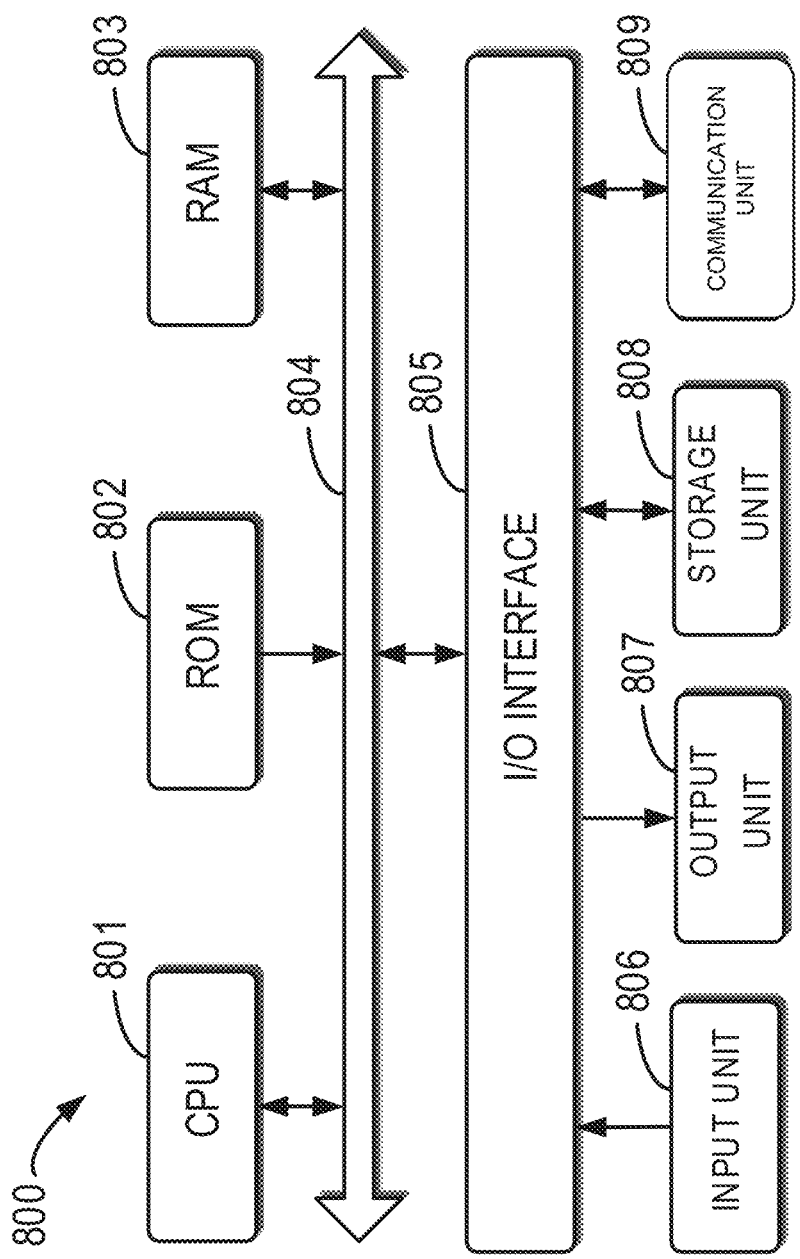
FIG. 8 is a block diagram illustrating a device for managing a distributed system in a distributed system according to some embodiments of the present disclosure.

FIG. 8 schematically illustrates a block diagram of a device 800 for managing a distributed system according to some embodiments of the present disclosure. As indicated, the device 800 includes a central processing unit (CPU) 801, which can execute various appropriate actions and processing based on the computer program instructions stored in a read-only memory (ROM) 802 or the computer program instructions loaded into a random access memory (RAM) 803 from a storage unit 808. The RAM 803 also stores all kinds of programs and data required by operating the storage device 800. CPU 801, ROM 802 and RAM 803 are connected to each other via a bus 804, to which an input/output (I/O) interface 805 is also connected.

A plurality of components in the device 800 are connected to the I/O interface 805, comprising: an input unit 806, such as a keyboard, a mouse and the like; an output unit 807, such as various types of displays, loudspeakers and the like; a storage unit 808, such as a storage disk, an optical disk and the like; and a communication unit 809, such as a network card, a modem, a wireless communication transceiver and the like. The communication unit 809 allows the device 800 to exchange information/data with other devices through computer networks such as Internet and/or various telecommunication networks.

Each procedure and processing described above, such as the method 600 or 700, can be executed by a processing unit 801. For example, in some embodiments, the method 600 or 700 can be implemented as computer software programs, which are tangibly included in a machine-readable medium, such as a storage unit 808. In some embodiments, the computer program can be partially or completely loaded and/or installed to the device 800 via the ROM 802 and/or the communication unit 809. When the computer program is loaded to the RAM 803 and executed by the CPU 801, one or more steps of the above described method 600 or 700 are implemented. Alternatively, in other embodiments, the CPU 801 may also be configured in any proper manner to implement the above process/method.

The present disclosure may be a method, a device, a system and/or a computer program product. The computer program product can include a computer-readable storage medium loaded with computer-readable program instructions thereon for executing various aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a distributed system, comprising:
    in response to receiving data that changes in a first memory region of a client in the distributed system, wherein the client is configured with a central processing unit, updating data in a second memory region of a server in the distributed system, wherein the server is configured with a set of graphical processing units for virtually providing an accelerated processing capability for the central processing unit of the client, with the received data based on a dual mapping between the first memory region and the second memory region, wherein the dual mapping is established by an application configured to allocate memory space for the first memory region in the client and memory space for the second memory region in the server and thereby create a unified memory access arrangement between the first memory region and the second memory region, wherein the first memory region and the second memory region mirror one another;
    in response to receiving a calling request for a computing node in the server from the client, wherein the computing node is at least one of the set of graphical processing units, causing the computing node to perform a processing step based on the updated data in the second memory region;
    determining data that changes after the processing step in the second memory region; and
    transmitting, to the client, the data that changes after the processing step, such that the client updates the data in the first memory region based on the dual mapping.

2. The method according to claim 1, further comprising:
    obtaining the dual mapping between the first memory region and the second memory region.

3. The method according to claim 2, wherein obtaining the dual mapping between the first memory region and the second memory region comprises:
    dividing the first memory region respectively into a first group of sub-regions;
    dividing the second memory region respectively into a second group of sub-regions corresponding to the first group of sub-regions, the sub-regions in the second group having the same sizes as the respective sub-regions in the first group; and
    establishing a dual mapping between the first group of sub-regions and the second group of sub-regions.

4. The method according to claim 1, wherein updating the data in the second memory region comprises:
    determining at least one sub-region in the first memory region associated with the data received from the client;
    determining, based on the dual mapping, a sub-region from the second memory region corresponding to the at least one sub-region; and
    updating data in the sub-region determined from the second memory region with the data received from the client.

5. The method according to claim 4, wherein determining the data that changes after the processing step in the second memory region comprises:
    obtaining a first hash value before the processing step and a second hash value after the processing step of the at least one sub-region in the second memory region; and
    in response to the first hash value being different from the second hash value, determining that the data in the at least one sub-region changes.

6. The method according to claim 1, wherein the second memory region of the server comprises a third memory region inside the computing node and a fourth memory region outside the computing node.

7. A computer program product tangibly stored in a computer readable storage medium and including machine executable instructions which, when executed, cause a machine to perform the method according to steps of claim 1.

8. A device for managing a distributed system, comprising:
one or more processors;
a memory coupled to the at least one of the one or more processors; and
computer program instructions stored in the memory which, when being executed by the at least one processor, cause the device to perform steps comprising:
in response to receiving data that changes in a first memory region of a client in the distributed system, wherein the client is configured with a central processing unit, updating data in a second memory region of a server in the distributed system, wherein the server is configured with a set of graphical processing units for virtually providing an accelerated processing capability for the central processing unit of the client, with the received data based on a dual mapping between the first memory region and the second memory region, wherein the dual mapping is established by an application configured to allocate memory space for the first memory region in the client and memory space for the second memory region in the server and thereby create a unified memory access arrangement between the first memory region and the second memory region, wherein the first memory region and the second memory region mirror one another;
in response to receiving a calling request for a computing node in the server from the client, wherein the computing node is at least one of the set of graphical processing units, causing the computing node to perform a processing step based on the updated data in the second memory region;
determining data that changes after the processing step in the second memory region; and
transmitting, to the client, the data that changes after the processing step, such that the client updates the data in the first memory region based on the dual mapping.

9. The device according to claim 8, wherein the steps further comprise:
obtaining the dual mapping between the first memory region and the second memory region.

10. A method of managing a distributed system, comprising:
in response to determining that data in a first memory region of a client in the distributed system changes, wherein the client is configured with a central processing unit, transmitting the data that changes to a server in the distributed system, wherein the server is configured with a set of graphical processing units for virtually providing an accelerated processing capability for the central processing unit of the client, such that the server updates data in a second memory region using the data that changes based on a dual mapping between the first memory region and the second memory region of the server, wherein the dual mapping is established by an application configured to allocate memory space for the first memory region in the client and memory space for the second memory region in the server and thereby create a unified memory access arrangement between the first memory region and the second memory region, wherein the first memory region and the second memory region mirror one another;
transmitting, to the server, a calling request for a computing node in the server, so that the computing node performs a processing step based on the data that changes in the second memory region; and
in response to receiving, from the server, the data that changes in the second memory region after the processing step, updating the data in the first memory region based on the dual mapping.

11. The method according to claim 10, further comprising:
obtaining the dual mapping between the first memory region and the second memory region.

12. The method according to claim 11, wherein obtaining the dual mapping between the first memory region and the second memory region comprises:
dividing the first memory region respectively into a first group of sub-regions;
dividing the second memory region respectively into a second group of sub-regions corresponding to the first group of sub-regions, the second group of sub-regions and the first group of sub-regions having a same size respectively; and
establishing a dual mapping between the first group of sub-regions and the second group of sub-regions.

13. The method according to claim 10, wherein updating the data in the first memory region comprises:
determining at least one sub-region in the second memory region associated with the data that changes and that is received from the server;
determining a sub-region from the first memory region corresponding to the at least one sub-region based on the dual mapping; and
updating data in the sub-region determined from the first memory region with the data that changes and that is received from the server.

14. The method according to claim 13, wherein determining that the data in the first memory region of the client changes comprises:
in response to a hash value of at least one sub-region in the first memory region changing, determining that the data in the at least one sub-region changes.

15. A computer program product tangibly stored on a computer readable storage medium and including machine executable instructions which, when executed, cause a machine to perform the method according to steps of claim 10.

16. A device for managing a distributed system, comprising:
one or more processors;
a memory coupled to at least one of the one or more processors;
computer program instructions stored in the memory which, when executed by the at least one processor, cause the device to perform steps comprising:
in response to determining that data in a first memory region of a client in the distributed system changes, wherein the client is configured with a central processing unit, transmitting the data that changes to a server in the distributed system, wherein the server is configured with a set of graphical processing units for virtually providing an accelerated processing capability for the central processing unit of the client, such that the server updates data in a second memory region using the data that changes based on a dual mapping between the first memory region and the second memory region of the server, wherein the dual mapping is established by an application configured to allocate memory space for the first memory region in the client and memory space for the second memory region in the server and thereby create a unified memory access arrangement between the first memory region and the second memory region, wherein the first memory region and the second memory region mirror one another;

transmitting, to the server, a calling request for a computing node in the server, so that the computing node performs a processing step based on the data that changes in the second memory region; and in response to receiving, from the server, the data that changes in the second memory region after the processing step, updating the data in the first memory region based on the dual mapping.

17. The device according to claim 16, wherein the computer program instructions, when executed by the at least one processor, cause the device to further perform the step of:

obtaining the dual mapping between the first memory region and the second memory region.

18. The device according to claim 17, wherein obtaining a dual mapping between the first memory region and the second memory region comprises:

dividing the first memory region respectively into a first group of sub-regions;

dividing the second memory region respectively into a second group of sub-regions corresponding to the first group of sub-regions, the second group of sub-regions and the first group of sub-regions having a same size respectively; and establishing a dual mapping between the first group of sub-regions and the second group of sub-regions.

19. The device according to claim 16, wherein updating the data in the first memory region comprises:

determining at least one sub-region in the second memory region associated with the data that changes and that is received from the server;

determining a sub-region from the first memory region corresponding to the at least one sub-region based on the dual mapping; and updating data in the sub-region determined from the first memory region with the data that changes and that is received from the server.

20. The device according to claim 19, wherein determining that the data in the first memory region of the client changes comprises:

in response to a hash value of at least one sub-region in the first memory region changing, determining that the data in the at least one sub-region changes.

* * * * *